United States Patent Office 3,592,733
Patented July 13, 1971

3,592,733
PROCESS FOR PRODUCING 5-GUANYLIC ACID NUCLEOTIDES
Shigeo Abe, Tokyo, and Akira Furuya and Ryo Okachi, Machida-shi, Japan, assignors to Kyowa Hakko Kogyo Co., Ltd., Tokyo, Japan
No Drawing. Filed Mar. 15, 1968, Ser. No. 713,308
Claims priority, application Japan, Mar. 18, 1967, 42/16,626
Int. Cl. C12d 13/06
U.S. Cl. 195—28                                   12 Claims

ABSTRACT OF THE DISCLOSURE

A process for producing 5'-guanylic acid nucleotides such as 5'-guanosine-mono-, di- and triphosphoric acid from 5'-xanthylic acid by fermentation which comprises culturing mutant strains of microorganisms having suitable properties under aerobic conditions in an aqueous nutrient medium containing 5'-xanthylic acid. Surface active agents may be added to the medium. The products are useful, for example, as flavoring agents.

---

This invention relates to a process for producing 5'-guanylic acid nucleotides. More particularly, it relates to a process for the production of 5'-guanylic acid nucleotides by fermentation. Even more particularly, the invention relates to a process for converting 5'-xanthylic acid into 5'-guanylic acid nucleotides, i.e., 5'-guanosine-monophosphoric acid, 5'-guanosine-diphosphoric acid or 5'-guanosine-triphosphoric acid, by fermentation.

5'-guanylic acid nucleotides have been widely used in the art as flavoring substances. Furthermore, they are important substances in the field of medicine. In the prior art, 5'-guanylic acid nucleotides have been produced by an extraction method from ribonucleic acid (RNA) of natural substances or microorganisms. A method of production using mutants of microorganisms has also been employed. However, these methods have various disadvantages, including the high costs necessary for carrying them out as well as the low yields of product which are obtained.

One of the objects of the present invention is to provide an improved process for the production of 5'-guanylic acid nucleotides which overcomes the disadvantages and deficiencies of the prior art methods.

Another object of the present invention is to provide a process for producing 5'-guanylic acid nucleotides by fermentation which may be carried out in an efficacious and simple manner.

A further object of the invention is to provide a process for producing 5'-guanylic acid nucleotides by fermentation which may be carried out advantageously on an industrial scale at low cost to give a high yield of product.

A still further object of the invention is to provide 5'-guanylic acid nucleotides such as 5'-guanosine-monophosphoric acid, 5'-guanosinediphosphoric acid and 5'-guanosine-triphosphoric acid.

These and other objects and advantages of the present invention will become apparent to those skilled in the art from a consideration of the following specification and claims.

In accordance with the present invention, it has been found that 5'-guanylic acid nucleotides are easily produced in high yield by using the mutants of microorganisms having the ability to convert 5'-xanthylic acid into 5'-guanylic acid nucleotides in high yield. The fact that 5'-xanthylic acid can be converted into 5'-guanylic acid nucleotides in high yield is unknown to the art and makes it possible, according to the present invention, to produce 5'-guanylic acid nucleotides advantageously at low cost for the first time.

The microorganism strains used in the process of the present invention are mutants induced by treating microorganisms belonging to various genera or natural mutants, i.e., all the strains which have the property of being able to convert 5'-xanthylic acid into 5'-guanylic acid nucleotides, by irradiation with ultraviolet rays, gamma rays of cobalt 60, etc., or by treating them with various chemical agents such as dimethyl sulfate, nitrous acid, nitrosoguanidine and the like. As a result of such a treatment, mutants having the characteristic described above as well as other nutritional-requiring properties (for example, requiring amino acids, vitamins, purines, pyrimidines and the like for their growth) are obtained.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, glutamic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. Of course, suitable purine and pyrimidine compounds may also be present in the aqueous nutrient medium.

Moreover, in the case of using strains having particular nutritional requirements, substances which satisfy these nutritional requirements should be added to the culture medium. These include, as stated above, substances such as amino acids, vitamins, purines, pyrimidines, biotin, etc.

It may also be advantageous to employ in the culture medium surface active agents such as those disclosed and discussed in commonly assigned copending application Ser. No. 643,832, filed on June 6, 1967. The disclosure therein concerning surface active agents is hereby expressly incorporated by reference into the present application. The surface active or dispersing agents to be added to the nutrient medium may be either anionic, cationic or non-ionic. Such substances are known in the art and, generically, comprise materials such as the sodium salts of high molecular weight alkyl sulfates or sulfonates, polyoxyethylene glycol derivatives, higher fatty acids having from 12 to 20 carbon atoms, for example, lauric acid, myristic acid, palmitic acid, stearic acid, oleic acid and the like, organic esters of higher fatty acids, such as sorbitan monooleate, etc.

The fermentation process of the present invention is carried out by adding 5'-xanthylic acid to a culture medium as described above. The 5'-xanthylic acid is converted into 5'-guanylic acid nucleotides by the mutant microorganism strains employed. The 5'-xanthylic acid may be added to the fermentation medium either at the time of inoculating the microorganisms therein or after the growth of the microorganisms. The amount of 5'-xanthylic acid added is usually 5.0–30 mg./ml. However, the amount employed may vary depending upon the particular strains used.

Various forms of 5'-xanthylic acid can be used as the additive to the medium. For example, highly purified 5'-xanthylic acid can be used. Or, crude 5'-xanthylic acid, substances containing 5'-xanthylic acid or culture liquors containing 5'-xanthylic acid which have been obtained by fermentation can be used if the growth of the microorganisms or the conversion into 5'-guanylic acid nucleotides is not impeded thereby.

The fermentation or culturing of the microorganisms is conducted under aerobic conditions, such as aerobic shaking of the culture or with stirring and aeration of a submerged culture, at a temperature of about 20° to 40° C. and at a pH of about 5.5 to 9.0. During culturing, it is desirable to adjust the pH of the culture liquor to a weakly alkine condition with ammonia water, a solution of urea or sodium hydroxide, etc., especially during latter period of culturing.

After about two to eight days of culturing under these conditions, significant amounts of 5'-guanylic acid nucleotides, namely 5' - guanosine-monophosphoric acid, 5'-guanosine-diphosphoric acid and 5' - guanosine-triphosphoric acid, are found singly or in mixture in the resultant culture liquor.

After the completion of culturing, the 5' - guanylic acid nucleotides produced can be recovered either as a single compound or as a mixture substance by conventional means, such as ion exchange resin treatment, extraction with solvents, precipitation, adsorption, chromatography or the like.

The following examples are given merely as illustrative of the present invention and are not to be considered as limiting. Unless otherwise noted, the percentages therein and throughout the application are by weight per liter of water. The microorganism strains advantageously employed in the present invention are described therein.

Example 1

*Brevibacterium ammoniagenes* No. 301 ATCC 21170 is used as the seed strain. This strain is a mutant obtained by treating *Brevibacterium ammoniagenes* ATCC 6872 with nitrosoguanidine. The seed bacterium is cultured in a culture medium containing 2% of glucose, 1% of peptone, 1% of yeast extract and 0.3% of sodium chloride at 30° C. for 24 hours. The seed medium has a pH of 7.2.

The seed culture is inoculated into the fermentation medium in the ratio of 10% by volume. Twenty ml. portions of the seed or fermentation medium are poured into 250 ml. conical flasks and used after sterilization at 120° C. for 10 minutes under pressure. The fermentation medium employed has the following composition:

10% glucose
0.6% urea
0.1% $KH_2PO_4$
0.3% $K_2HPO_4$
0.1% $MgSO_4 \cdot 7H_2O$
0.01% $CaCl_2 \cdot 2H_2O$
30 µg./l. biotin
0.5% yeast extract
0.5% peptone The pH of the fermentation medium is adjusted to 7.8 with dilute sodium hydroxide. 5'-xanthylic acid (80% purity) has previously been added to the fermentation medium in an amount necessary to give a final concentration of 20 mg./ml. before the inoculation of seed culture into the fermentation medium.

Culturing is then carried out with aerobic shaking of the culture at 30° C. for 96 hours. The pH of the medium is adjusted to 7.7 during culturing with dilute ammonia water starting 48 hours after the beginning of cultivation and continuing until the end. After the completion of fermentation, 12.5 mg./ml. of 5'-guanosine-monophosphoric acid, 2.3 mg./ml. of 5'-guanosine-diphosphoric acid and 4.3 mg./ml. of 5'-guanosine-triphosphoric acid are accumulated in the culture liquor. Small amounts of 5'-xanthylic acid, guanosine and guanidine are also found in the fermentation liquor.

One liter of the filtrate obtained by filtering the microorganism cells from the culture liquor is adjusted to a pH of 2.0 with hydrochloric acid and then adsorbed in active carbon. The effluent obtained with ethanolic ammonia is then concentrated. Thereafter, the pH of the concentrated solution is adjusted to 2.5, and the solution is passed through an anion exchange resin (Dowex-1, Cl type) and eluted with hydrochloric acid. Fractions containing 5'-guanosine-monophosphoric acid, 5'-guanosine-diphosphoric acid and 5'-guanosine-triphosphoric acid are recovered. The solutions containing these fractions are adjusted to a pH of 7.0 and concentrated under reduced pressure. Ethanol is added thereto, and the mixture of sodium salts of 5'-guanylic acid nucleotides is then separated. The yield is 15 grams.

The mixture of sodium salts is adsorbed on an anion exchange resin (Dowex-1, Cl type). Three compounds, namely, 5'-guanosine-monophosphoric acid, 5'-guanosine-diphosphoric acid and 5'-guanosine-triphosphoric acid, are separated by fractional elution with hydrochloric acid. Each of the fractional solutions is adjusted to a pH of 7.0 and concentrated under reduced pressure, each being isolated as the sodium salt. As a result, 6.8 g. of 5'-guanosine-monophosphoric acid, 1.2 g. of 5' - guanosine-diphosphoric acid and 2.7 g. of 5'-guanosine-triphosphoric acid are obtained separately.

EXAMPLE 2

*Brevibacterium ammoniagenes* No. 301 ATCC 21170 is again employed as the seed microorganism. A seed culture is obtained by using the same medium and conditions as described in Example 1.

The resultant seed culture is inoculated in an amount of 10% by volume into a fermentation medium having the following composition:

15% glucose
0.6% urea
0.1% $KH_2PO_4$
0.3% $K_2HPO_4$
0.1% $MgSO_4 \cdot 7H_2O$
1.0% cornsteep liquor
0.2% peptone
10 mg./l. $FeSO_4 \cdot 7H_2O$
10 mg./l. $MnCl_2 \cdot 4H_2O$
10 mk./l. $ZnSO_4 \cdot 7H_2O$ Culturing is carried out at 35° C. for 48 hours. Then, a 5'-xanthylic acid-fermentation liquor (containing 20 mg./ml. of 5'-xanthylic acid) is added in an equivalent amount to the fermentation liquor. Also, a surface active agent, Nimean S 215 (polyoxyethylene alkylamine, manufactured by Nippon Yushi Co. Ltd.), is added to the medium in the amount of 2.0 mg./ml. Culturing is then continued for another 48 hours. During the cultivation, the pH of the medium is adjusted to 7.6 with a 20% urea solution.

After the completion of fermentation, 3 mg./ml. of 5'-guanosine-monophosphoric acid and 5 mg./ml. of 5'-guanosine-triphosphoric acid are accumulated in the culture liquor. In addition, small amounts of 5'-guanosine-diphosphoric acid, guanosine and guanine are found in the culture liquor.

EXAMPLE 3

The natural mutant *Corynebacterium glutamicum* No. 401 ATCC 21171 is used as the seed strain. The strain is a natural mutant obtained from *Corynebacterium glutamicum* ATCC 13032. A seed culture thereof is inoculated in the ratio of 10% by volume into a fermentation medium having the following composition:

10% glucose
0.5% $KH_2PO_4$
0.5% $K_2HPO_4$
0.5% $MgSO_4 \cdot 7H_2O$
1.5% $NH_4Cl$
0.5% yeast extract
3% $CaCO_3$ The fermentation medium has a pH of 7.5. At the time of inoculation into the fermentation medium, 5'-xanthylic acid is also added in the amount of 15 mg./ml. The other culturing conditions are the same as described in Example 1. After 120 hours of culturing, 7.0 mg./ml. of 5'-guanosine-monophosphoric acid is found to be accumulated in the culture liquor. Simultaneously, small amounts of guanosine and guanine are also accumulated.

EXAMPLE 4

Using the same seed medium and fermentation medium as described in Example 1, culturing is conducted with aerobic shaking at 30° C. for 96 hours using the mutants of the various kinds of microorganisms shown in Table 1. The other conditions of culturing are identical with those described in Example 1. The amounts of 5'-guanylic acid nucleotides accumulated in the resultant culture liquor are shown in Table 1.

tions in an aqueous nutrient medium containing 5'-xanthylic acid, accumulating the 5'-guanylic acid nucleotides in the resultant culture liquor, and recovering said 5'-guanylic acid nucleotides therefrom.

2. The process of claim 1 wherein culturing is carried out at a temperature of about 20° to 40° C. and at a pH of about 5.5 to 9.0.

3. The process of claim 1, wherein said nutrient medium contains about 5.0 to 30 mg./ml. of 5'-xanthylic acid.

4. The process of claim 1, wherein said 5-guanylic acid nucleotides are selected from the group consisting of 5'-guanosine - monophosphoric acid, 5' - guanosine - diphosphoric acid, 5'-guanosine-triphosphoric acid and mixtures thereof.

5. The process of claim 1 wherein a culture liquor containing 5'-xanthylic acid is added to said nutrient medium.

6. The process of claim 1 wherein said nutrient medium also contains a surface active agent.

7. The process of claim 2, wherein said microorganism is *Brevibacterium ammoniagenes* ATCC 21170.

8. The process of claim 2, wherein said microorganism is *Corynebacterium glutamicum* ATCC 21171.

9. A process for producing 5'-guanylic acid nucleotides from 5'-xanthylic acid which comprises culturing *Brevibacterium ammoniagenes* ATCC 21179 or *Corynebacterium glutamicum* ATCC 21171 under aerobic conditions in an aqueous nutrient medium containing 5'-xan-

TABLE 1

| Name of genus and species of strains | Strain No. | Source of mutation | 5'-guanylic acid nucleotides accumulated (mg./ml.) | | |
|---|---|---|---|---|---|
| | | | 5'-GMP [1] | 5'-GDP [2] | 5'-GTP [3] |
| *Arthrobacter citreus* | 101 | Ultraviolet rays | 4.2 | 2.2 | 4.5 |
| *Arthrobacter ureafaciens* | 111 | Natural mutation | Trace | 2.8 | 4.6 |
| *Bacillus cereus* | 201 | γ-Rays | 1.3 | 4.3 | 2.8 |
| *Bacillus megaterium* | 211 | Nitrosoguanidine | Trace | Trace | 6.3 |
| *Bacillus pumilus* | 221 | Natural mutation | 1.4 | 3.8 | 4.5 |
| *Brevibacterium ammoniagenes* | 302 | Nitrosoguanidine | 6.1 | 2.3 | 4.8 |
| *Brevibacterium helvolum* | 311 | Ultraviolet rays | Trace | 5.2 | Trace |
| *Brevibacterium insectiphilium* | 321 | γ-Rays | 4.3 | 3.8 | Trace |
| *Corynebacterium glutamicum* | 402 | Ultraviolet rays | 6.3 | Trace | 1.2 |
| *Escherichia coli* | 501 | Diethyl sulfate | 1.8 | 2.6 | 2.2 |
| *Micrococcus sodonensis* | 601 | Nitrous acid | 3.2 | 4.3 | Trace |
| *Micrococcus varians* | 611 | Ultraviolet rays | 5.2 | Trace | 3.3 |
| *Proteus vulgaris* | 701 | Nitrosoguanidine | Trace | 2.4 | 4.6 |
| *Pseudomonas fluorescens* | 801 | γ-Rays | 2.4 | 2.4 | 2.3 |
| *Sarcina lutea* | 901 | Natural mutation | 4.8 | 4.6 | 3.7 |
| *Microbacterium flavum* | 1001 | Ultraviolet rays | 4.7 | 2.3 | 3.4 |

[1] 5'-GMP=5'-guanosine-monophosphoric acid.
[2] 5'-GDP=5'-guanosine.diphosphoric acid.
[3] 5'-GTP=5'-guanosine-triphosphoric acid.

It can be seen from the above examples that strains of microorganisms belonging to a wide variety of genera may be employed in the present invention. The main prerequisite therefor is that the strain used be capable of converting 5'-xanthylic acid into the desired 5'-guanylic acid nucleotides.

The invention being thus described, it will be obvious that the same may be varied in many ways. Such variations are not to be regarded as a departure from the spirit and scope of the invention, and all such modifications are intended to be included within the scope of the following claims.

It is claimed:
1. A process for producing 5'-guanylic acid nucleotides from 5'-xanthylic acid which comprises culturing a microorganism capable of converting 5'-xanthylic acid directly into 5'-guanylic acid nucleotides and being selected from the group consisting of *Brevibacterium ammoniagenes* and *Corynebacterium glutamicum* under aerobic condithylic acid, accumulating the 5'-guanylic acid nucleotides in the resultant culture liquor, and recovering said 5'-guanylic acid nucleotides therefrom.

10. The process of claim 9 wherein said nutrient medium contains about 5.0 to 30 mg./ml. of 5'-xanthylic acid.

11. The process of claim 10, wherein said 5'-guanylic acid nucleotides are selected from the group consisting of 6'-guanosine-monophosphoric acid, 5'-guanosine-diphosphoric acid, 5'-triphosphoric acid and mixtures thereof.

12. The process of claim 11, wherein said nutrient medium also contains a surface active agent.

References Cited

UNITED STATES PATENTS 3,296,087   1/1967   Mitsugi et al. _____ 195—28(N)
3,359,177   12/1967  Nara et al. _____ 195—28(N)

ALVIN E. TANENHOLTZ, Primary Examiner

UNITED STATES PATENT OFFICE
CERTIFICATE OF CORRECTION

Patent No. 3,592,733            Dated July 13, 1971

Inventor(s) Shigeo Abe, Akira Furuya and Ryo Okachi

It is certified that error appears in the above-identified patent and that said Letters Patent are hereby corrected as shown below:

Column 6,

Line 25, which now reads:

*bacterium ammoniagenes* ATCC 21179 or *Corynebac-* should read as follows:

*bacterium ammoniagenes* ATCC 21170 or *Corynebac-*

Signed and sealed this 27th day of June 1972.

(SEAL)
Attest:

EDWARD M. FLETCHER, JR.
Attesting Officer

ROBERT GOTTSCHALK
Commissioner of Patents